3,279,206
ABSORPTION REFRIGERATION SYSTEMS
Louis H. Leonard, Jr., De Witt, N.Y., assignor to Carrier Corporation, Syracuse, N.Y., a corporation of Delaware
Filed Dec. 8, 1964, Ser. No. 416,703
4 Claims. (Cl. 62—141)

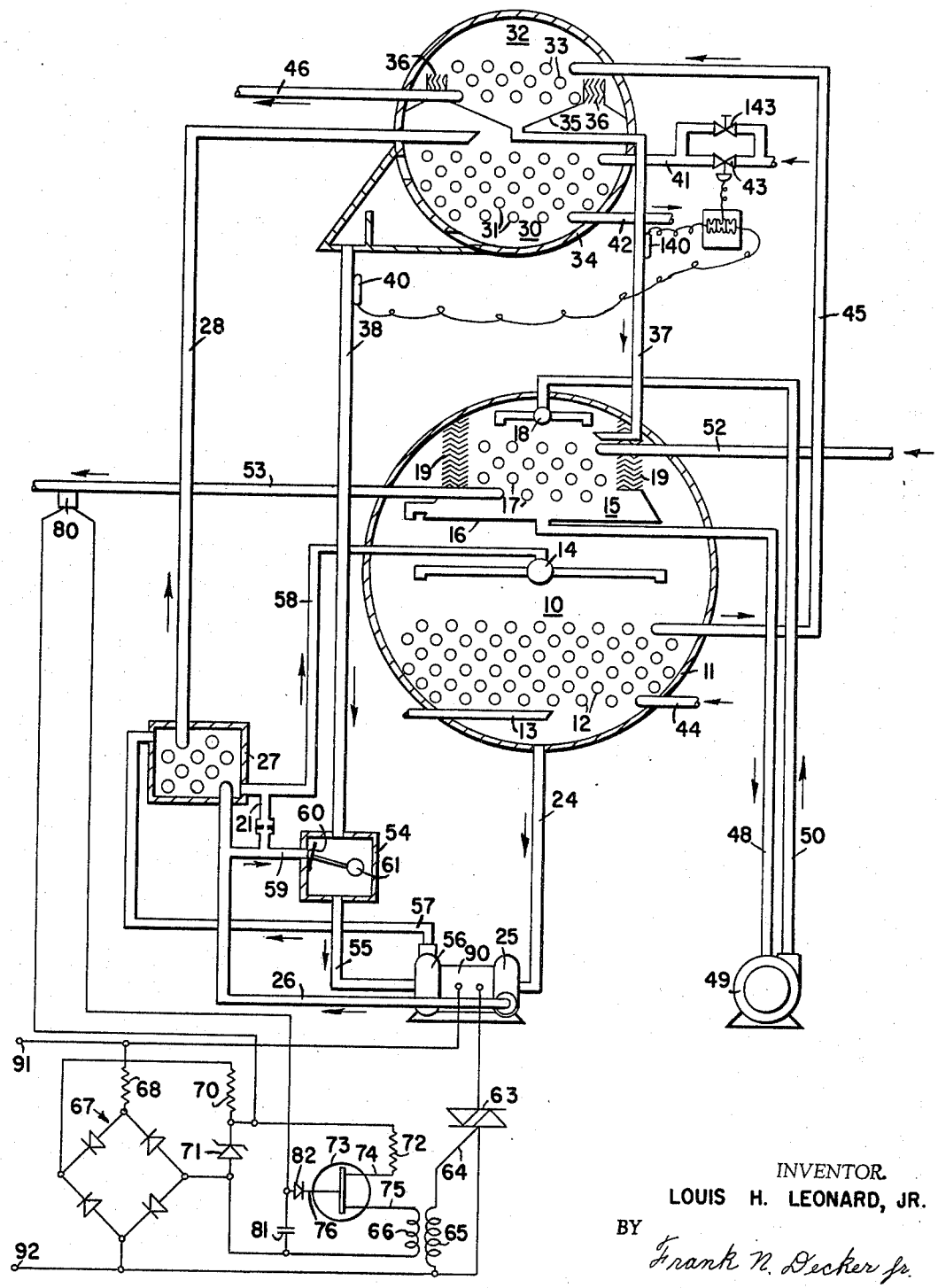

This invention relates to absorption refrigeration systems, and more particularly relates to an absorption refrigeration machine having an improved system and solution circuit.

An absorption refrigeration system of the type to which this invention is applicable may employ a hygroscopic salt solution, such as lithium bromide and water as an absorption solution, and may use water as a refrigerant. Such machines include an absorber for absorbing refrigerant vapor, an evaporator for evaporating refrigerant liquid to provide chilled water, a generator for concentrating absorbent solution which is diluted by absorption of refrigerant vapor in the absorber, and a condenser for condensing refrigerant vapor vaporized from the absorbent in the generator.

Cooling water from a suitable source, such as a cooling tower, is passed through heat exchange tubes in the absorber to remove the heat of condensation and dilution from absorbent solution therein and is then passed through the condenser to remove the heat of vaporization of the refrigerant therein to condense the refrigerant. The cooling water is then passed back to the cooling tower where the heat picked up from the machine is rejected to the atmosphere. The condensed refrigerant is returned from the condenser to the evaporator for re-evaporization therein, and the concentrated absorbent solution is returned from the generator to the absorber for reabsorption of refrigerant vapor. Reference is made to Leonard Patent 3,053,056, granted Sept. 11, 1962, and Berestneff et al. Patent 2,565,838, granted Aug. 28, 1951, for a complete description of typical absorption refrigeration machines of this type.

Prior absorption refrigeration machines of the type described have generally required control over the temperature of the cooling water supplied to the machine from the cooling tower and have required control over the condensing temperature in the condenser of the absorption machine. Control over the entering cooling water temperature has generally been achieved by providing a thermostatically actuated valve to bypass cooling water around the cooling tower. The cooling tower bypass valve bypasses some of the water returning to the cooling tower from the absorption machine and mixes it directly with cooling water being returned to the machine from the cooling tower. The bypass valve is set so as to maintain a minimum cooling water temperature in order to prevent the condenser from being cooled below a predetermined temperature. In addition, a bypass line, having a manual bypass valve in it, is normally provided to bypass some of the cooling water forwarded from the absorber around the condenser section to prevent excessive cooling of the condenser. This latter valve is usually manual and is set to provide a minimum condensing temperature when the cooling water temperature is at the minimum temperature permitted by the cooling tower bypass valve.

It is apparent that it would be desirable to avoid the cost of the two valves required in the cooling water circuit, and particularly the cost of the thermostatic cooling tower bypass valve which is relatively expensive. Also by restricting the lowest temperature that the cooling tower can provide to the absorption machine, the heat rejection of the machine to the cooling water, and hence the cooling capacity, is reduced below that which the machine could provide if the minimum cooling water temperature were uncontrolled.

However, it is generally necessary to establish a minimum cooling water temperature and a minimum condensing temperature in order to prevent solidification of solution in the heat exchanger and to maintain a sufficient difference in pressure between the generator and the absorber to return concentrated strong solution to the absorber. The temperature of the cooling water passed through the condenser establishes the condenser pressure which in turn establishes the generator pressure. Consequently, too low a condensing temperature results in insufficient difference in pressure between the generator and the absorber to force the strong solution through the resistance of the heat exchanger and into the absorber. Also, if the solution in the absorber is cooled too much, it will cause solidification of strong solution in the strong solution side of the heat exchanger when the cold weak solution passes through the heat exchanger to the generator.

If the solution concentration in the machine is reduced sufficiently to permit operation at low cooling water temperature, the full load refrigeration capacity of the machine is severely limited. Furthermore, since the condensing temperature established is a compromise between maximum capacity which could be provided and minimum difference in pressure which is necessary, the heat exchanger must be designed to have relatively low restriction to solution flow. This requirement results in having to provide a large heat exchanger which requires a substantial volume of expensive absorbent solution to fill it.

The absorption refrigeration machine according to the instant invention overcomes the above enumerated problems by pumping weak solution to the generator with one pump and pumping strong solution out of the generator to the absorber with another pump. This enables the use of uncontrolled cooling water because the strong solution can be pumped out of the generator regardless of the difference in pressure between the generator and absorber. Also, a compact, small volume, heat exchanger can be used and the solution charge can be reduced because the pumps supply the necessary power to overcome the resistance of a compact heat exchanger. Also, the heat transfer in the heat exchanger and the consequent efficiency of the machine are improved by the higher solution velocity provided by the strong solution pump.

The control system for an absorption refrigeration machine generally is required to produce a specific chilled water temperature regardless of the load imposed on the machine. A simple and highly effective control for an absorption machine is the regulation of the flow of solution to the generator in accordance with the load imposed on the machine which is reflected in the leaving chilled water temperature. In the past, solution valves, such as described in the aforementioned Leonard and Berestneff patents, have been employed for capacity control. While such control systems provide excellent control and are highly successful it would be desirable to eliminate the solution valve, if possible, for purposes of economy.

However, such conventional control systems do not necessarily lend themselves to operation with an absorption refrigeration machine in which a constant volume of solution is pumped both into and out of the generator. The quantity of strong solution pumped from the generator is always less than the quantity of weak solution supplied to the generator because of the amount of refrigerant which is vaporized from the weak solution in the generator. Desirably, the control system should assure that the solution quantities pumped to and from the generator are reasonably balanced. It will be apparent that if solution is "stacked up" in the generator, by a constant volume pump, the absorber may not function properly; and if the generator is "starved" for solution by a constant volume pump, excessive concentration may take place and result in solidification of strong solution in the heat exchanger.

Accordingly, it is a principal object of the present invention to provide an improved absorption refrigeration machine and method of operating the same.

It is a further object of this invention to provide an improved control system and method of controlling the capacity of an absorption refrigeration machine.

These and other objects are achieved in the illustrated preferred embodiment of this invention by providing an absorption refrigeration machine having the usual evaporator, absorber, generator, and condenser connected by passages to provide refrigeration. Weak solution from the absorber is forwarded by a weak solution pump through one side of a heat exchanger to the generator. Strong solution concentrated in the generator is returned by another solution pump through the other side of the heat exchanger to the absorber. Because a pump is used to forward the concentrated solution from the generator to the absorber, the heat exchanger may be made compact so as to have a low storage volume to reduce the solution charge required for the machine. Preferably, the strong solution pump and the weak solution pump are connected by a shaft which is driven by a single motor. The capacity of the absorption machine is controlled by regulating the flow of solution to and from the generator by varying the speed of the pump motor in accordance with the leaving chilled water temperature from the evaporator. Consequently the volume of solution supplied to and withdrawn from the generator is changed to regulate capacity of the machine.

This invention will be more readily understood from the following detailed description and with reference to the attached drawing wherein the figure is a schematic view, partially in cross-section, showing an embodiment of an absorption refrigeration machine employing this invention.

Referring particularly to the drawing, there is shown a typical absorption refrigeration machine comprising an absorber section 10 within a shell 11. A plurality of heat exchange tubes 12 are provided within the absorber section. A purge line 13 leads from the absorber and conducts noncondensible gases therefrom to a suitable purge unit (not shown). A spray header 14 is located above the absorber section.

Also disposed in shell 11 is an evaporator section 15 comprising a pan-like member 16 within which is disposed a plurality of heat exchange tubes 17. A spray header 18 is located above heat exchange tubes 17 for distributing refrigerant thereover. Evaporator section 15 is in open communication with absorber section 10 through eliminators 19 which prevent entrained liquid refrigerant particles from being carried from evaporator 15 into absorber 10.

In operation, a suitable refrigerant is sprayed over tubes 17 in evaporator section 15 and a suitable absorbent solution is sprayed over tubes 12 in absorber section 10. Liquid refrigerant is vaporized in evaporator section 15 and passes through eliminators 19 into absorber section 10 where the refrigerant vapor is absorbed by the absorbent solution. The vaporization of the refrigerant in evaporator section 15 absorbs heat from the fluid passing through heat exchange tubes 17 and this heat is carried with the vapor into absorber section 10 where it is given up to a cooling fluid passing through heat exchange tubes 12. Thus, the evaporation of refrigerant in evaporator section 15 produces a cooling or refrigeration effect on the fluid to be chilled passing through heat exchange tubes 17. A weak solution line 24 leads from a lower portion of absorber section 10 containing weak solution and pump 25 serves to pass the weak solution through line 26 and solution heat exchanger 27 through line 28 to generator section 30.

As used herein, the terms "strong solution" refers to an absorbent solution strong in absorbing power and the term "weak solution" refers to absorbent solution weak in absorbing power. A suitable absorbent for a refrigeration system of the type described comprises a hydroscopic aqueous salt solution such as lithium bromide and water; a suitable refrigerant is water.

The absorption of refrigerant vapor by absorbent solution in absorber section 10 dilutes the absorbent solution and diminishes the refrigerant supply. In order to maintain the refrigeration machine in operation, it is necessary to concentrate this weak solution by separating it from the absorbed refrigerant. For his purpose, a generator section 30 and a condenser section 32 are provided.

Generator section 30 is located in shell 34 and comprises a plurality of heat exchange tubes 31 for passing steam or other heating fluid. Also located within shell 34 is condenser section 32 comprising a pan-like member 35 within which is disposed a plurality of heat exchange tubes 33 for passing cooling water. Eliminators 36 are provided to prevent strong solution from being entrained in refrigerant vapor passed from generator section 30 to condenser section 32.

Refrigerant line 37 leads from pan-like member 35 to evaporator section 15 and serves to return condensed refrigerant from the condenser section to the evaporator section. Strong solution passes from generator section 30 through a strong solution line 38 to a float chamber 54. The strong solution is forwarded from float chamber 54 through line 55, strong solution pump 56, and line 57 to heat exchanger 27. Heat exchanger 27 serves to pass relatively hot, strong absorbent solution from the generator section in heat exchange relation with relatively cool, weak solution being forwarded to the generator for concentration therein. The cooled strong solution is passed to absorber 10 from heat exchanger 27 through line 58.

A bypass line 59 is provided between weak solution line 26, into which pump 25 discharges, and float chamber 54, which empties into the inlet of pump 56. Float valve 60 is actuated by float 61 and admits solution into chamber 54 when the level of solution therein drops below a predetermined level.

A recirculation line and pump (not shown) may be employed to recirculate solution in the absorber but its use is not required because adequate distribution of solution may be provided by pump 56. Instead of employing a recirculation pump, it is preferred to provide a restricted bypass passage 21 to increase the quantity of solution sprayed over tubes 12 in absorber 10.

Inlet line 41 and outlet line 42 are provided to conduct a heating medium such as steam or hot water through heat exchange tubes 31, in order to concentrate the weak solution by boiling off of refrigerant vapor therefrom. A control valve 43 is provided in line 41 to control the supply of heating medium to the generator. The refrigerant vaporized in generator 30 passes through eliminators 36 and is condensed in condenser 32. A cooling water inlet line 44 is connected to heat exchange tubes 12 in absorber section 10 from which the cooling water passes through line 45 and heat exchange tubes 33 in the condenser section. The cooling water is then discharged through line 46. The cooling water serves to remove the heat of dilution and condensation from the absorbent solution in absorber section 10 and serves to remove the heat of vaporization to condense refrigerant vapor in condenser section 32.

A suitable refrigerant recircualtion line 48 and recirculation pump 49 pass refrigerant from pan 16 of the evaporator section through line 50 to spray header 18 so that refrigerant may be sprayed over heat exchange tubes 17 to wet them and aid in evaporation of refrigerant and cooling of heat exchange tubes 17. Entering line 52 and leaving line 53 are provided to conduct a heat exchange fluid to be cooled, such as water, through heat exchange tubes 17 to cool the fluid by the resulting heat exchange with the evaporating refrigerant in evaporator 15. This cooled heat exchange fluid is passed through line 53 to suitable remotely located heat exchangers (not shown) to provide cooling in the desired areas.

In accordance with this invention, weak solution pump 25 and strong solution pump 56 are preferably disposed on a common shaft and are driven by a single alternating current motor 90 which is connected to a source of alternating current such as power line terminals 91, 92 though a switch 63. Switch 63 may desirably be a bidirectional gated solid state switch of a type sold under the trademark "Triac." Switch 63 is provided with a gate 64 connected to the secondary winding 65 of a pulse transformer which triggers the switch to a conducting state by applying either a positive or negative pulse to gate 64. Switch 63 should be sufficiently fast in operating so that it may be switched on and off during that portion of each half cycle of alternating current supplied to motor 90, to provide a desired average power so that the motor speed and consequent speed of the pumps is varied in accordance with the capacity demand on the absorption machine.

A control circuit is provided to control the operation of switch 63 in accordance with the desired capacity of the absorption machine. As shown in the drawing, a full-wave diode rectifier circuit 67 is connected in series with a dropping resistor 68 to provide a source of D.-C. voltage across a series connected resistor 70 and Zener diode 71. It will be appreciated that Zener diode 71 has a variable resistance characteristic such that it provides a constant voltage drop across its terminals.

A series circuit comprising unijunction transistor 73 having one base 74 connected in series with resistor 72 and another base 75 connected in series with the primary winding 66 of the pulse transformer is connected across Zener diode 71 which provides a constant voltage to the series circuit.

A temperature sensitive resistance element, such as thermistor 80, is connected in series with a charging capacitor 81 across the constant voltage provided by Zener diode 71. Thermistor 80 is preferably secured to leaving chilled water line 53 to sense the refrigeration load on the absorption machine by sensing the chilled water temperature. Unijunction transistor 73 has an emitter 76 connected through a diode 82, which prevents leakage current from charging capacitor 81, to a junction between thermistor 80 and charging capacitor 81. It may be desirable in practice to add various additional circuits to prevent spurious gating of switch 63. Also, it is desirable to employ a high resistance motor rotor in motor 60, having a resistance tailored to the control circuit for best operation.

It will be appreciated that the circuit shown is illustrative generally of a phase control type of motor speed control. The control circuit shown merely illustrates one type of motor speed control system and other types of motor speed control can be used instead.

In operation, switch 63 is in a nonconducting state and motor 90 is deenergized until a pulse is applied to gate 64. A charge builds up on charging capacitor 81 at a rate which is determined by the resistance of thermistor 80, which in turn is a function of the chilled water temperature in line 53. When the charge on capacitor 81 reaches a predetermined value, unijunction transistor 73 becomes conducting and the charge on capacitor 81 is discharged through primary winding 66 of the pulse transformer. When capacitor 81 discharges, a pulse is induced in secondary winding 65 of the pulse transformer which is applied to gate 64 of switch 63 causing the switch to conduct.

Switch 63 is preferably a solid state device having the characteristic that once it is turned on by a pulse being applied to gate 64, it remains in the conducting state until the voltage across the device becomes negligible. Consequently, switch 63 remains conducting after a pulse is applied to gate 64 until the end of the half cycle of alternating current during which it begins conducting. The valve of the electrical components are chosen so that switch 64 is turned on for a time during each half cycle by the control circuit such that the power supplied to motor 60 is just sufficient to rotate pumps 25 and 56 at a speed which provides the desired solution flows and, consequently, the desired refrigeration capacity. The resistance range of thermistor 80, is chosen so that as the leaving chilled water temperature in line 53 increases, indicating an increased refrigeration load, the resistance of the thermistor decreases and capacitor 81 charges more rapidly. Consequently, switch 63 is turned on for a greater period of time during each half cycle of alternating current, thus increasing the speed of motor 90 and pumps 25 and 56 to provide greater solution flows between absorber 10 and generator 30. The additional solution flow to generator 30 and the increased return of strong solution through line 38 provides increased refrigeration capacity to compensate for the increased load and to reduce the chilled water temperature down to the desired temperature.

It is desirable to prevent overconcentration of strong solution in generator 30 to prevent crystallization of strong solution when cooled in heat exchanger 27. Overconcentration might occur during periods of relatively light load when pump 25 operates at a relatively low speed and passes only a relatively small quantity of weak solution to generator 30. For this purpose, valve 43 is provided in line 41 which supplies heating medium to the generator. The heating medium may be steam, hot water, hot gas, or any other hot fluid. Valve 43, may be a simple, inexpensive shutoff valve because as long as there is strong absorbent solution in the generator, the capacity of the machine can be controlled by varying the speed of pump 25, even when heat is not being supplied to the generator. Preferably, valve 43 is connected to a suitable control responsive to the differential temperature between strong solution temperature in line 38 sensed by bulb 40 and the condensing temperature in condenser 32, sensed by bulb 140 on refrigerant line 37. A manual valve 143 may be employed to bypass a relatively small fixed quantity of heating medium around valve 43 to keep the solution in generator 30 warm. Bulbs 40 and 140 cause valve 43 to close and reduced the supply of heating medium to generator in the event that the difference in temperatures becomes excessive. Conversely, valve 43 opens when the difference in temperatures drops If desired, valve 43 may be of the modulating type and bypass valve 143 may be eliminated. This type of control is particularly advantageous with a system having an uncontrolled low cooling water temperature in smoothing out the operation of the machine because it compensates for changes in cooling water temperature.

It will be appreciated that if the strong absorbent solution in the generator is sufficiently concentrated, or if the generator is sufficiently warm to continue concentrating solution, it is not necessary for valve 43 to open, and the rise in chilled water temperature may be compensated for by the control system increasing solution flow.

Alternatively, valve 43 may be responsive to any suitable condition of operation of the system, such as strong solution temperature in line 38 or the temperature of leaving chilled water in line 53 as a means of preventing overconcentration of the strong solution.

In operation, pumps 25 and 56 are designed to provide a balance solution flow to and from the generator under conditions of the heaviest refrigeration load which will be imposed on the machine. When the chilled water temperature in line 53 drops, indicating a reduced load, the speed of pumps 25 and 56 will be reduced by the same amount and the solution flows to and from the generator will both be proportionally reduced. Thus, the tendency of stacking up excessive solution in the generator and starving of the generator when controlling solution flow is reduced. Furthermore, should insufficient solution head be available in line 55 to prevent cavitation of pump 56, float valve 60 will open to supply the required excess solution. By employing float chamber 54 in the manner described, not only is cavitation of pump 56 prevented, but also the undesirable noise produced under conditions of low suction head is reduced.

Under some conditions, sufficient solution might not be available to properly wet tubes 12 with strong solution alone, but restricted bypass line 21 will pass sufficient solution to line 58 to insure proper wetting of the tubes.

While it is preferred to drive pumps 25 and 56 with a single motor, for purposes of economy, it is within the scope of this invention to use separate motors for driving the pumps. In that event, either or preferably both of pumps 25 and 56 should be provided with appropriate speed controls. An advantage, however, of using the preferred embodiment is that absorbent solution is on both sides of the motor so that bearing lubrication and motor cooling is facilitated. Also, any leakage of solution from one pump to the other has only a negligible effect on the performance of the refrigeration system.

By employing a system in accordance with this invention, the heat exchanger may be designed for the maximum desired heat transfer while at the same time being made compact because the resistance of the heat exchanger is overcome by locating pump 56 ahead of it in the strong solution line. Thus, the volume of solution required by the heat exchanger can be materially reduced and the total cost of the solution charge in the machine is correspondingly reduced. Also, the steam rate (efficiency) of the machine is greatly improved due to the higher heat transfer coefficient in the heat exchanger resulting from the higher solution velocity provided by the strong solution pump.

An important advantage of this invention is that the minimum temperature of the cooling water supplied to the absorber and condenser may be uncontrolled. This is because pump 56 returns strong solution from generator 30 to absorber 10 irrespective of the pressure difference between the sections.

It will be appreciated that not only is the cost of the cooling tower bypass valve eliminated by the practice of this invention, but it also unnecessary to employ a bypass line and manual valve around the condenser as has been frequent prior practice. Furthermore, there is no costly solution valve required in the control system and the only necessary control valve is a relatively inexpensive shutoff valve in the line conveying heating material to the generator.

Various modifications of the invention will be readily apparent to those skilled in the art. For example, other types of pump speed controls such as a magnetic coupling or a variable speed turbine may be used. It will be therefore appreciated that there is shown and described a preferred embodiment of the invention and that it may be otherwise embodied in the scope of the following claims.

I claim:

1. An absorption refrigeration machine adapted to contain an absorbent solution and having a generator, a condenser, an absorber and an evaporator connected to provide refrigeration, said absorption machine including weak solution passage means for forwarding weak absorbent solution from said absorber to said generator for concentration therein; strong solution passage means for forwarding strong absorbent solution from said generator to said absorber for absorption of refrigerant vapor therein; a weak solution pump in said weak solution passage means to forward solution therein; a strong solution pump in said strong solution passage to forward strong solution therein; capacity control means for varying the refrigeration capacity of said machine comprising means to adjust the speeds of both of said pumps in accordance with a condition of operation of said machine to control the quantity of solution supplied to and withdrawn from said generator; and concentration control means to prevent overconcentration of absorbent solution in said generator during periods of reduced solution flow.

2. An absorption refrigeration machine adapted to contain an absorbent solution and having a generator, a condenser, an absorber and an evaporator connected to provide refrigeration, said absorption machine including weak solution passage means for forwarding weak absorbent solution from said absorber to said generator for concentration therein; strong solution passage means for forwarding strong absorbent solution from said generator to said absorber for absorption of refrigerant vapor therein, a weak solution pump in said weak solution passage means to forward solution therethrough; a strong solution pump in said strong solution passage to forward strong solution therethrough; said weak solution pump and said strong solution pump being driven by a single motor; capacity control means for varying the refrigeration capacity of said machine comprising means to control the speed of said motor in response to a condition of operation of said machine to vary the speed of both of said pumps and the quantity of solution flowing in both of said passage means in response to said condition of operation of said machine and concentration control means to prevent overconcentration of absorbent solution in said generator during periods of reduced solution flow.

3. An absorption refrigeration machine adapted to contain an absorbent solution and having a generator, a condenser, an absorber and an evaporator connected to provide refrigeration, said absorption machine including weak solution passage means for forwarding weak absorbent solution from said absorber to said generator for concentration therein; strong solution passage means for forwarding strong absorbent solution from said generator to said absorber for absorption of refrigerant vapor therein; a weak solution pump in said weak solution passage means to forward solution therein; a strong solution pump in said strong solution passage to forward strong solution therein; said weak solution pump and said strong solution pump being coupled to a single motor; capacity control means for varying the refrigeration capacity of said machine comprising means to vary the speed of said motor in response to the refrigeration load imposed on said machine to vary the speed of both of said pumps and the quantity of solution flowing in both of said passage means in response to the refrigeration load imposed on said machine; and concentration control means to prevent overconcentration of absorbent solution in said generator responsive to a condition of operation of said machine.

4. An absorption refrigeration machine adapted to contain an absorbent solution and having a generator, a condenser, an absorber and an evaporator connected to provide refrigeration, said absorption machine including means to pass a cooling fluid having an uncontrolled low temperature through said condenser to cool and condense refrigerant vapor therein; weak solution passage means for forwarding weak absorbent solution from said absorber to said generator for concentration therein; strong solution passage means for forwarding strong absorbent solution from said generator to said absorber for absorption of refrigerant vapor therein; a weak solution pump in said weak solution passage means to forward solution therein; a strong solution pump in said strong solution passage to forward strong solution therein; said weak solution pump and said strong solution pump being coupled to a single motor; capacity control means for varying the refrigeration capacity of said machine comprising means to vary the average power supplied to said motor to vary speed of said motor in response to the refrigation load imposed on said machine to vary the speed of both of said pumps and the quantity of solution flowing in both of said passage means in response to the refrigeration load imposed on said machine; and concentration control means to prevent overconcentration of absorbent solution in said generator; said concentration control being responsive to the difference in temperature between strong solution leaving said generator and the condensing temperature in said condenser.

References Cited by the Examiner

UNITED STATES PATENTS

| | | | |
|---|---|---|---|
| 2,372,087 | 3/1945 | Karassik | 122—451 |
| 3,123,005 | 3/1964 | Bredehoeft, et al. | 103—35 |
| 3,124,938 | 3/1964 | Leonard | 62—103 |
| 3,195,318 | 7/1965 | Miner | 62—483 X |
| 3,202,208 | 8/1965 | Geiringer | 165—40 X |

LLOYD L. KING, *Primary Examiner.*